(12) United States Patent
Jung et al.

(10) Patent No.: US 10,122,935 B2
(45) Date of Patent: Nov. 6, 2018

(54) METHOD FOR CONTROLLING MOBILE TERMINAL AND MOBILE TERMINAL

(71) Applicant: LG ELECTRONICS INC., Seoul (KR)

(72) Inventors: Byungwook Jung, Seoul (KR); Jinsool Lee, Seoul (KR); Kyunghee Kang, Seoul (KR); Sungmin Woo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/505,779

(22) PCT Filed: Jun. 2, 2015

(86) PCT No.: PCT/KR2015/005518
§ 371 (c)(1),
(2) Date: Feb. 22, 2017

(87) PCT Pub. No.: WO2016/047888
PCT Pub. Date: Mar. 31, 2016

(65) Prior Publication Data
US 2017/0280040 A1    Sep. 28, 2017

(30) Foreign Application Priority Data

Sep. 25, 2014 (KR) .......................... 10-2014-0128130

(51) Int. Cl.
*H04N 5/232* (2006.01)
*G03B 15/05* (2006.01)
(Continued)

(52) U.S. Cl.
CPC ........... *H04N 5/2354* (2013.01); *G03B 15/05* (2013.01); *H04N 5/2256* (2013.01); *H04N 5/23232* (2013.01)

(58) Field of Classification Search
None
See application file for complete search history.

(56) References Cited

U.S. PATENT DOCUMENTS 6,047,137 A * 4/2000 Yamamoto ............... G03B 7/16
396/157
2006/0165399 A1* 7/2006 Feng ........................ G03B 7/00
396/61

(Continued)

FOREIGN PATENT DOCUMENTS

KR    10-2014-0093513 A    7/2014

*Primary Examiner* — W B Perkey
(74) *Attorney, Agent, or Firm* — Birch, Stewart, Kolasch & Birch, LLP

(57) ABSTRACT

A method of controlling a mobile terminal includes the steps of injecting a laser signal to a direction at which a camera is facing, receiving a reflected laser signal corresponding to the injected laser signal returned in a manner of being reflected to a subject, calculating a distance from the subject using a difference between time of injecting the laser signal and time of receiving the reflected laser signal, calculating standard illuminance of a flash based on the distance from the subject, injecting light by controlling the flash according to the standard illuminance and storing a first image including the subject using a camera module. According to the method, since it is able to obtain an image of which a whole screen is maintained by a reasonable brightness, a subject and a background can be included in an image.

16 Claims, 8 Drawing Sheets

(51) Int. Cl.
*H04N 5/235* (2006.01)
*H04N 5/225* (2006.01)

(56) References Cited

U.S. PATENT DOCUMENTS

| | | |
|---|---|---|
| 2006/0284824 A1 | 12/2006 | Yeh |
| 2007/0025717 A1* | 2/2007 | Raskar .................. G03B 15/03 396/155 |
| 2007/0230933 A1 | 10/2007 | Sugimoto et al. |
| 2013/0235364 A1 | 9/2013 | Kyung et al. |
| 2013/0300894 A1* | 11/2013 | Imai ........................ G06T 5/50 348/229.1 |
| 2013/0307951 A1 | 11/2013 | Ono |
| 2015/0092073 A1* | 4/2015 | Park ....................... H04N 5/232 348/218.1 |
| 2015/0227025 A1* | 8/2015 | Park ....................... G03B 15/05 348/224.1 |
| 2016/0037067 A1* | 2/2016 | Lee ................... H04N 5/23232 348/208.6 |
| 2016/0142610 A1* | 5/2016 | Rivard ................ H04N 5/2356 348/239 |
| 2016/0182788 A1* | 6/2016 | Wan .................. H04N 5/23219 348/370 |
| 2017/0045616 A1* | 2/2017 | Masuda .................... G01C 3/06 |
| 2017/0280040 A1* | 9/2017 | Jung .................... H04N 5/2354 |
| 2017/0353649 A1* | 12/2017 | Yang ................... H04N 5/2354 |

\* cited by examiner

[Fig. 1a]
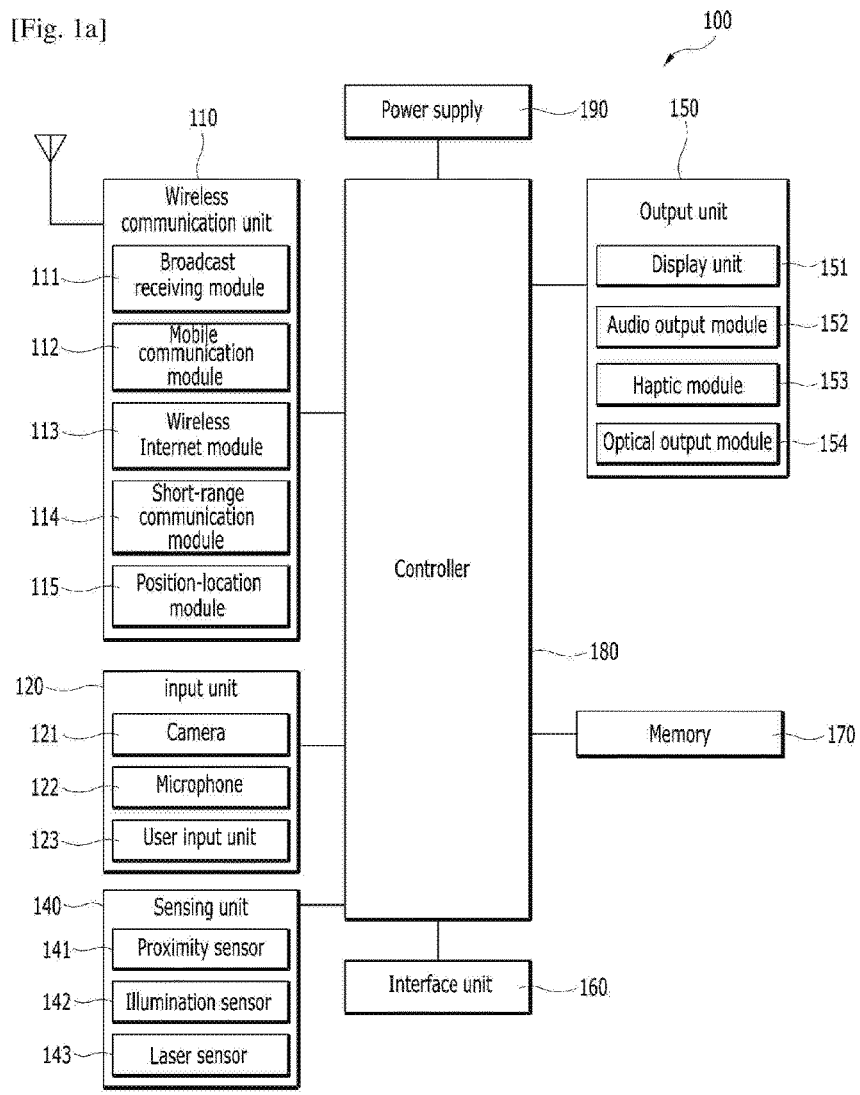
[Fig. 1b]
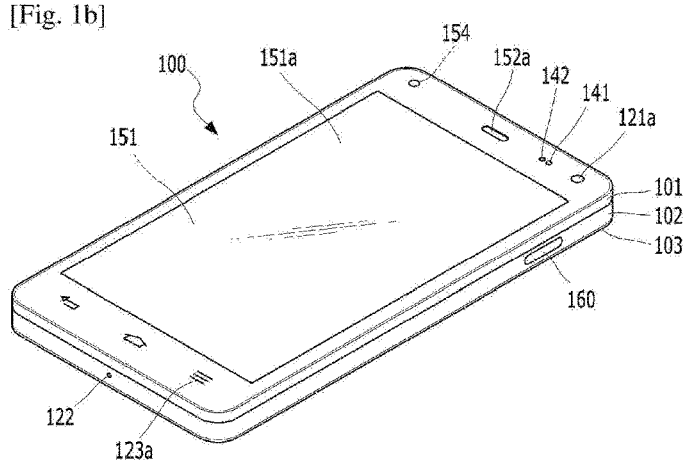

[Fig. 1c]
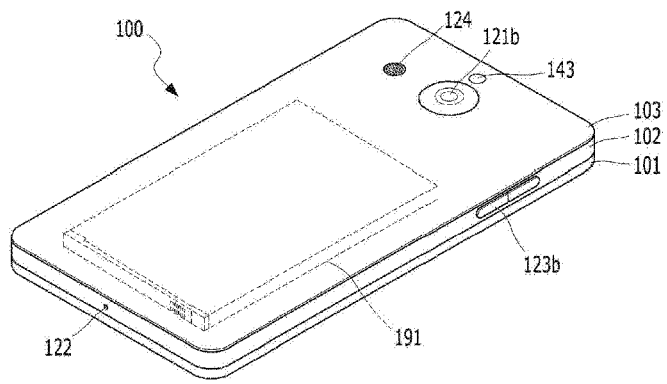
[Fig. 2]
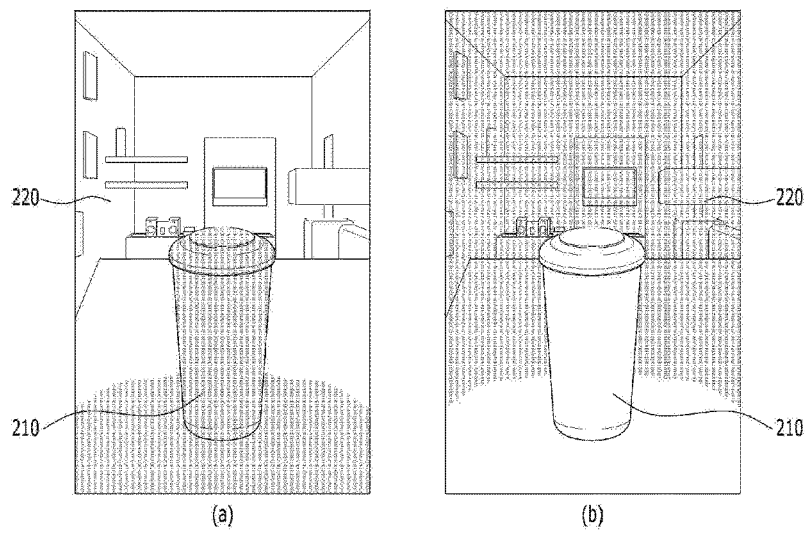
(a) (b)
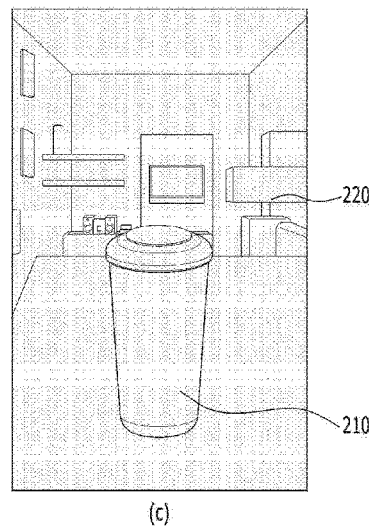
(c)

[Fig. 3]
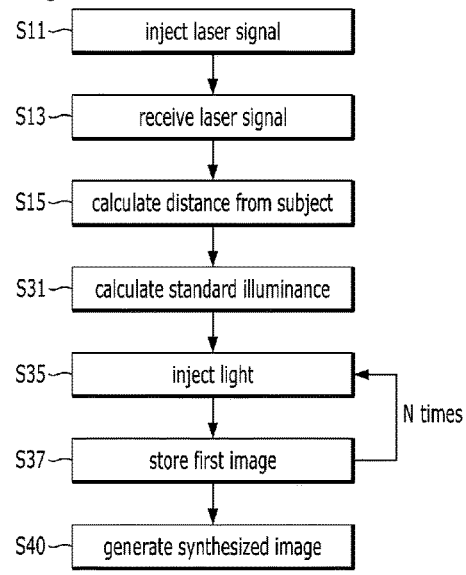
[Fig. 4]
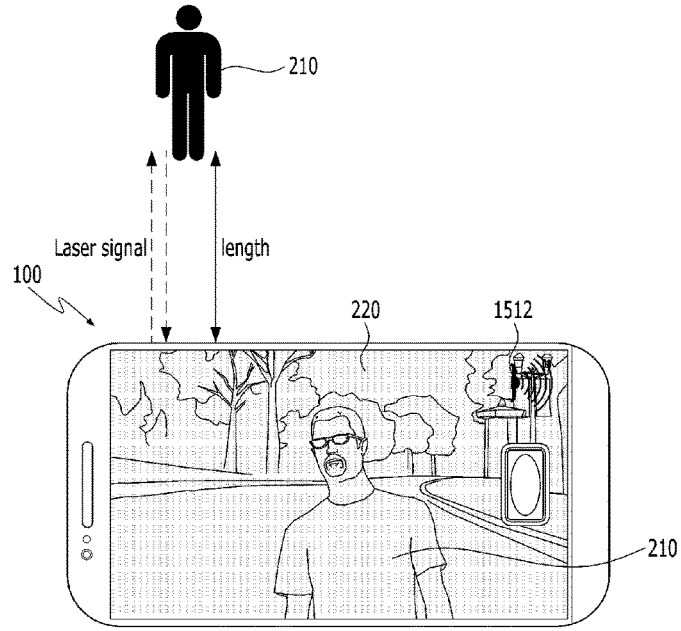
[Fig. 5]
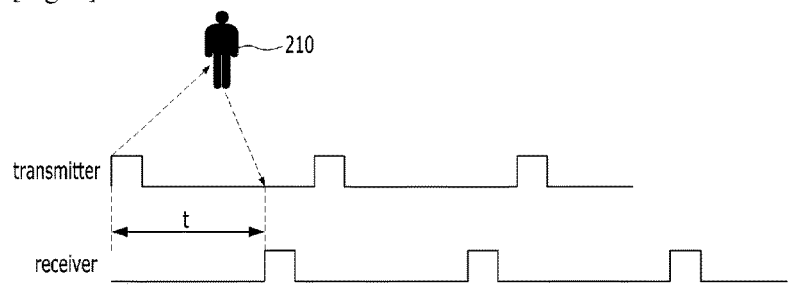

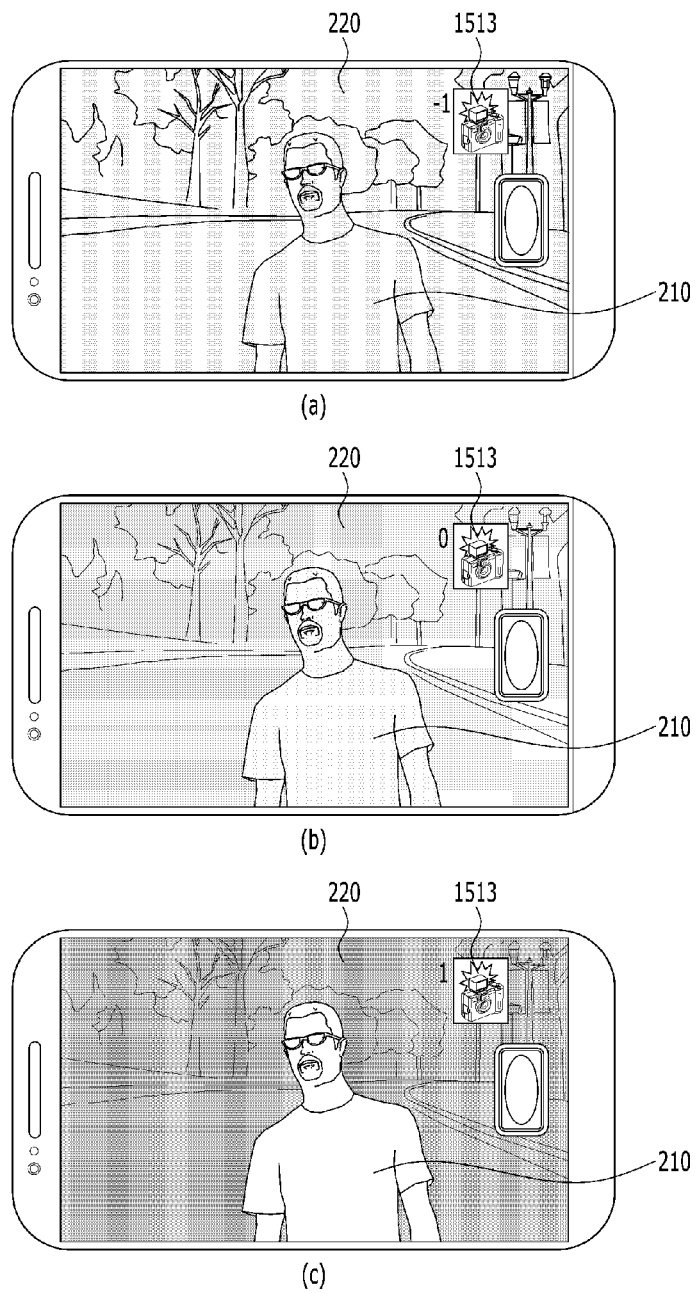
[Fig. 6]

[Fig. 7]
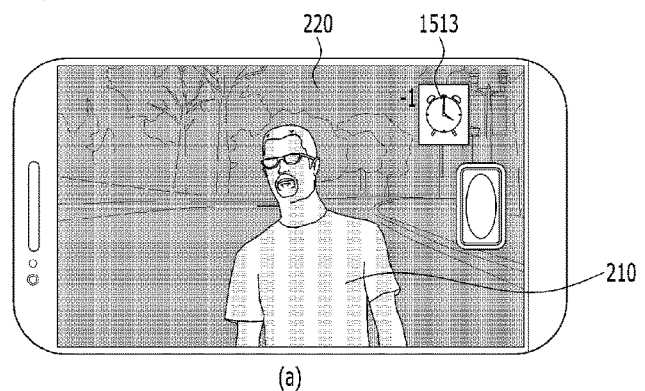
(a)
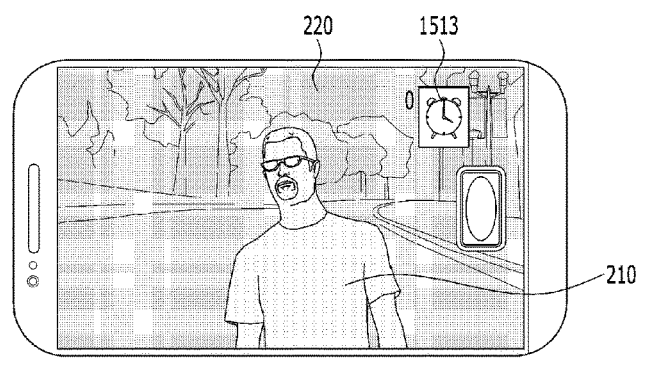
(b)
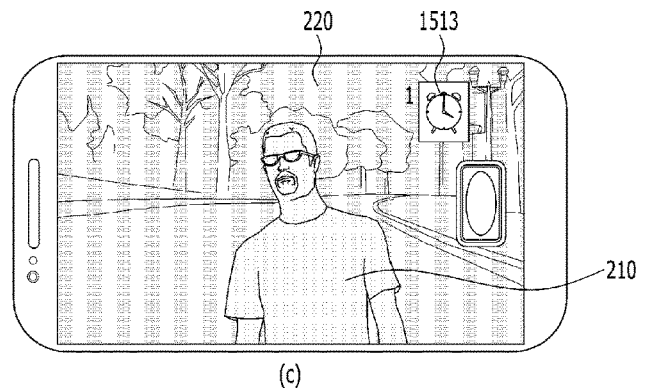
(c)
[Fig. 8]
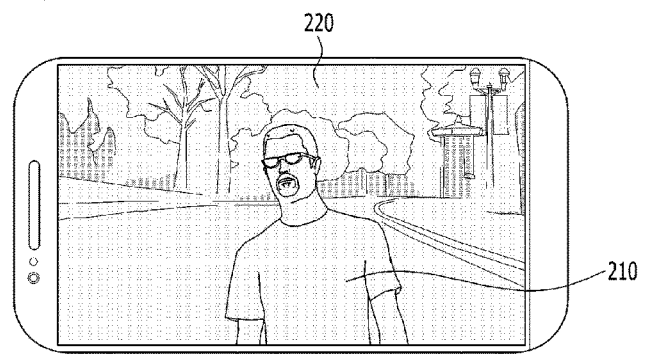

[Fig. 9]
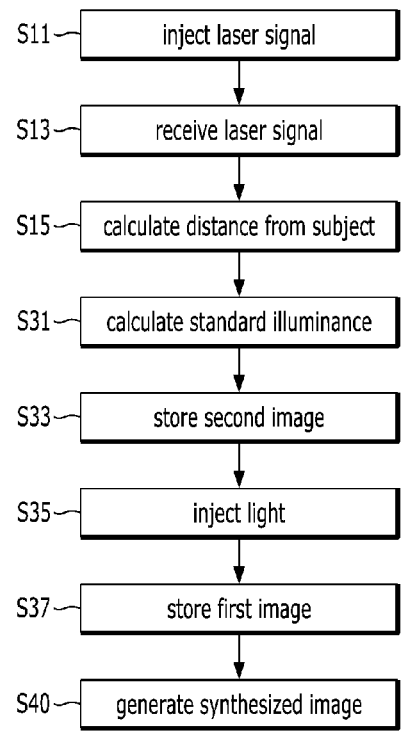
[Fig. 10]
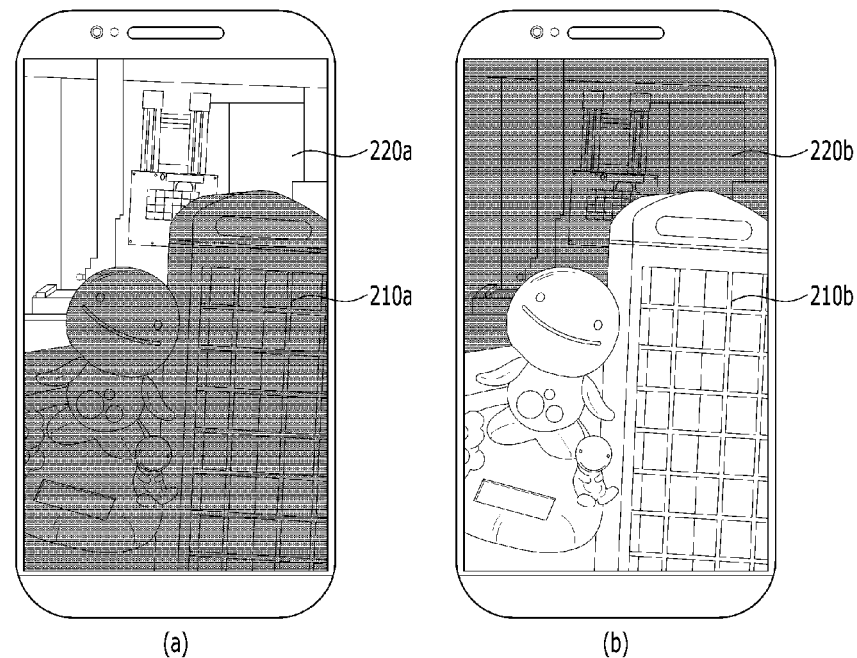

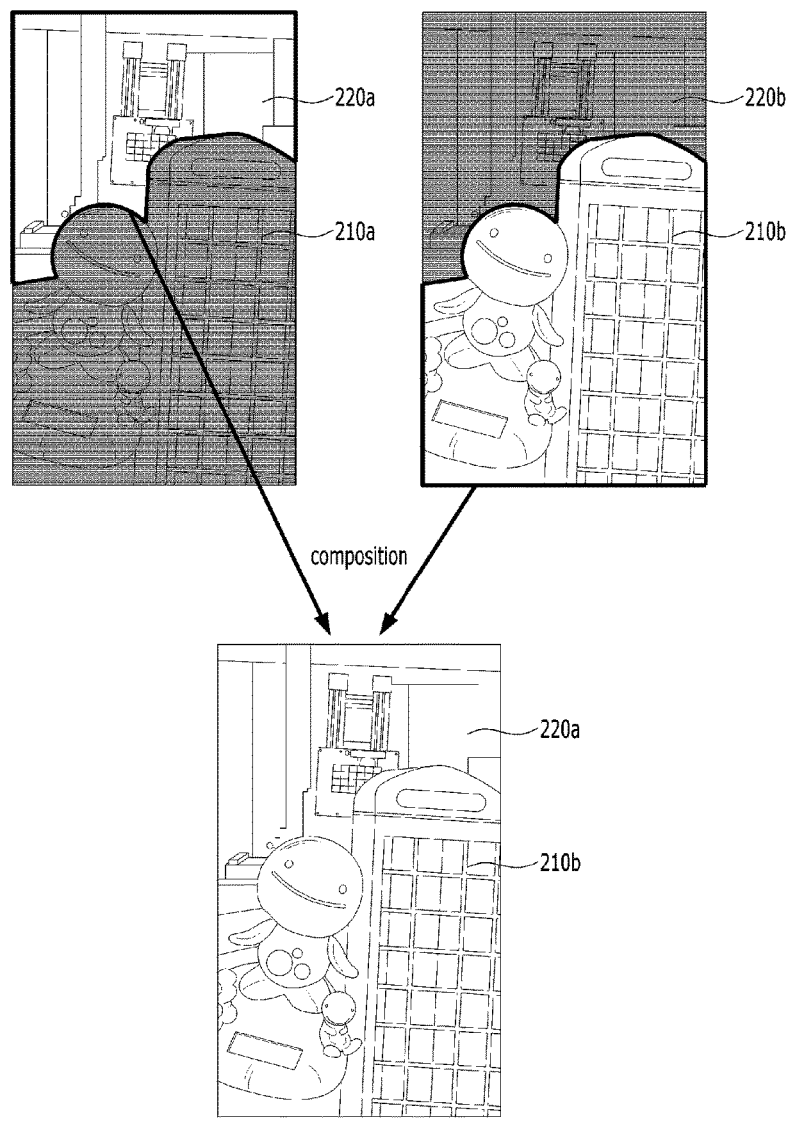
[Fig. 11]

[Fig. 12]
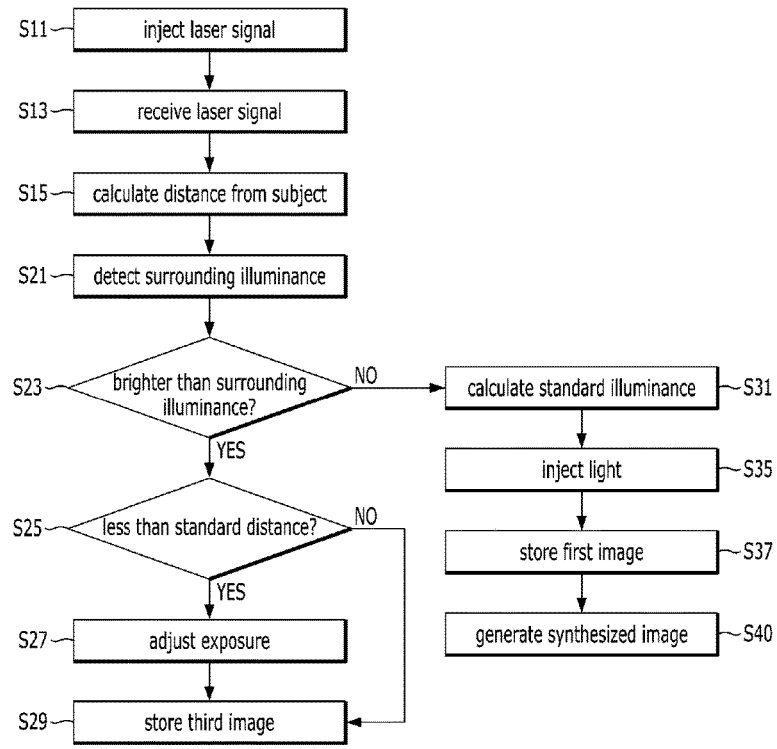
[Fig. 13]
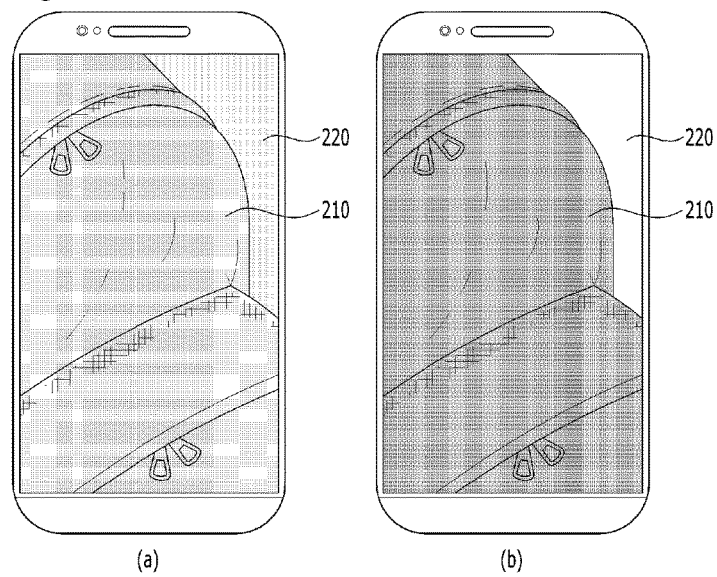

METHOD FOR CONTROLLING MOBILE TERMINAL AND MOBILE TERMINAL

CROSS REFERENCE TO RELATED APPLICATIONS

This application is the National Phase of PCT/KR2015/005518 filed on Jun. 2, 2015, which claims priority under 35 U.S.C. § 119(a) to Patent Application No. 10-2014-0128130 filed in the Republic of Korea on Sep. 25, 2014, all of which are hereby expressly incorporated by reference into the present application.

TECHNICAL FIELD

The present invention relates to a method of controlling a mobile terminal obtaining an image of reasonable brightness using a camera flash and a laser sensor and a mobile terminal.

BACKGROUND ART

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

As such functions become more diversified, the mobile terminal can support more complicated functions such as capturing images or video, reproducing music or video files, playing games, receiving broadcast signals, and the like. By comprehensively and collectively implementing such functions, the mobile terminal may be embodied in the form of a multimedia player or device.

An image sensor is installed to capture a picture or a video. Unlike a film camera, the image sensor stores a captured image by digitalizing the image and can correct the digitalized image. Hence, a photographer can store the image in a manner of transforming the image according to a preferred sense of color and brightness.

As a size of the image sensor is getting smaller and a resolution becomes a high resolution, an image of high quality can be obtained by a mobile terminal. Moreover, a technology enabling a user to obtain a preferred image data by transforming an image data captured by the image sensor is developing.

In particular, in order to capture an image in a dark pace, there is a method of capturing a bright image by controlling an aperture to make light flow in an image sensor for a long time and a method of capturing a bright image via forced lighting using a flash. Yet, in former case, an afterimage may be left due to a movement of an image. In the latter case, it may be hard to see a background because of too much contrast between a subject and the background.

SUMMARY OF THE INVENTION

In order to solve the aforementioned problem, one object of the present invention is to provide a method of controlling an image sensor of a mobile terminal injecting a flash of reasonable brightness using a laser sensor.

To achieve these and other advantages and in accordance with the purpose of the present invention, as embodied and broadly described, according to one embodiment, a method of controlling a mobile terminal includes the steps of injecting a laser signal to a direction at which a camera is facing, receiving a reflected laser signal corresponding to the injected laser signal returned in a manner of being reflected to a subject, calculating a distance from the subject using a difference between time of injecting the laser signal and time of receiving the reflected laser signal, calculating standard illuminance of a flash based on the distance from the subject, injecting light by controlling the flash according to the standard illuminance and storing a first image including the subject using a camera module.

The step of injecting the light can further include the step of injecting the light with over illuminance brighter than the standard illuminance, injecting the light with the standard illuminance and injecting the light with under illuminance darker than the standard illuminance. The step of storing the first image can further include the step of respectively storing the first image when the light is injected with the over illuminance, the standard illuminance and the under illuminance.

The step of storing the first image can store a plurality of first images by differentiating exposure.

A synthesized image can be generated by extracting a part captured by appropriate brightness from a plurality of the obtained first images.

The method can further include the steps of storing a second image including a subject prior to the step of injecting the light and synthesizing a background of the second image with the subject of the first image.

The method can further include the step of calculating reflectivity of the subject using a difference between an amount of light of the injected laser signal and an amount of light of the reflected laser signal and the step of calculating the standard illuminance can calculate the standard illuminance in consideration of the distance from the subject and the reflectivity of the subject.

The injected laser signal can include a unique waveform.

The method can further include the step of outputting information on a progress of at least one or more steps among the steps on a display unit.

The method can further include the step of measuring surrounding illuminance. If the surrounding illuminance is bright, the step of injecting the light is omitted. The light can be injected only when the surrounding illuminance is dark.

The method can further include the steps of calculating brightness of a sidelight within an angle of the camera module and controlling exposure of the camera module on the basis of the distance from the subject and the brightness of the sidelight. If the brightness of the sidelight is dark and the distance from the subject is less than a standard distance, the step of controlling the exposure can reduce the exposure.

To further achieve these and other advantages and in accordance with the purpose of the present invention, as embodied and broadly described, according to a different embodiment, a mobile terminal includes a lens to which light is inputted, a camera module configured to generate a first image by storing the light inputted via the lens, a flash configured to inject light to a direction at which the lens is facing, a laser output unit configured to inject a laser signal to the direction at which the lens is facing, a laser reception unit configured to detect a reflected laser signal corresponding to the injected laser signal returned in a manner of being reflected to a subject and a controller configured to control the flash in a manner of calculating a distance from the subject using a difference between time of injecting the laser signal and time of receiving the reflected laser signal and calculating standard illuminance of a flash based on the calculated distance.

The controller can control illuminance of the flash to inject the light with over illuminance brighter than the standard illuminance, inject the light with the standard illuminance and inject the light with under illuminance darker than the standard illuminance and the camera module can respectively store the first image when the light is injected with the over illuminance, the standard illuminance and the under illuminance.

The mobile terminal further includes an aperture configured to control an amount of light inputted to the camera module. The controller can adjust exposure by controlling degree of opening of the aperture and the camera module can store a plurality of first images according to the control of the aperture.

The controller can generate a synthesized image by extracting a part captured by appropriate brightness from a plurality of the obtained first images.

The camera module can obtain a second image before the flash injects light and the controller can generate a synthesized image by extracting a subject and a background from the first image and the second image, respectively.

The controller calculates reflectivity of the subject using a difference between an amount of light of the injected laser signal and an amount of light of the reflected laser signal and can calculate the standard illuminance in consideration of the reflectivity of the subject.

The mobile terminal further includes illumination sensor configured to measure surrounding illuminance. If the surrounding illuminance is bright, the controller can control the flash not to inject light.

The controller calculates brightness of a sidelight within an angle of the camera module. If the brightness of the sidelight is dark and the distance from the subject is less than a standard distance, the controller can reduce exposure time.

According to at least one embodiment of the present invention, since it is able to obtain an image of which a whole screen is maintained by a reasonable brightness, a subject and a background can be included in an image. And, an original color of a subject can be represented by distinguishing a case of a subject of black color from a case of less light.

Effects obtainable from the present invention may be non-limited by the above mentioned effect. And, other unmentioned effects can be clearly understood from the following description by those having ordinary skill in the technical field to which the present invention pertains.

It is to be understood that both the foregoing general description and the following detailed description of the present invention are exemplary and explanatory and are intended to provide further explanation of the invention as claimed.

BRIEF DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 1a is a block diagram of a mobile terminal in accordance with the present disclosure;

FIGS. 1b and 1c are conceptual views of one example of the mobile terminal, viewed from different directions;

FIG. 2 is a diagram for an image captured by a camera module according to flash brightness;

FIG. 3 is a flowchart for a method of controlling a mobile terminal according to one embodiment of the method of controlling the mobile terminal of the present invention;

FIGS. 4 and 5 are diagrams for explaining a method of measuring a distance from a subject using a laser sensor according to one embodiment of a method of controlling a mobile terminal of the present invention;

FIG. 6 is a diagram for an image according to brightness of a flash according to one embodiment of a method of controlling a mobile terminal of the present invention;

FIG. 7 is a diagram for an image according to exposure time of an aperture according to one embodiment of a method of controlling a mobile terminal of the present invention;

FIG. 8 is a diagram for a synthesized image according to one embodiment of a method of controlling a mobile terminal of the present invention;

FIG. 9 is a flowchart for a method of controlling a mobile terminal according to a different embodiment of the method of controlling the mobile terminal of the present invention;

FIG. 10 is a diagram for an image captured by a camera module according to a different embodiment of a method of controlling the mobile terminal of the present invention;

FIG. 11 is a diagram for a process of obtaining a synthesized image by synthesizing images of FIG. 10;

FIG. 12 is a flowchart for a method of controlling a mobile terminal according to a further different embodiment of the method of controlling the mobile terminal of the present invention;

FIG. 13 is a diagram for a third image according to a further different embodiment of a method of controlling a mobile terminal of the present invention.

DETAILED DESCRIPTION OF THE EMBODIMENTS

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, portable camera, wearable devices (for example, smart watches, smart glasses, head mounted displays (HMDs)), and the like.

Reference is now made to FIGS. 1a-1c, where FIG. 1a is a block diagram of a mobile terminal in accordance with the present disclosure, and FIGS. 1b and 1c are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1a, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1a, the sensing unit 140 is shown having a proximity sensor 141 an illumination sensor 142 and laser sensor 143.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs.

The controller 180 may provide or process information or functions appropriate for a user by processing signals, data, information and the like, which are input or output by the various components depicted in FIG. 1a, or activating application programs stored in the memory 170. As one example, the controller 180 controls some or all of the components illustrated in FIGS. 1*a*-1*c* according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring now to FIGS. 1*b* and 1*c*, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

In this case, the terminal body can be considered as at least one aggregate of a mobile terminal 100 and can be comprehended as a concept indicating the aggregation.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151*a* of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121*b* or an audio output module 152*b*.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a unibody is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151*a* and the front case 101, between the front case 101 and the rear case 102, or between the rear case 102 and the rear cover 103, to hermetically seal an inner space when those cases are coupled.

FIGS. 1*b* and 1*c* depict certain components as arranged on the mobile terminal.

However, it is to be understood that alternative arrangements are possible and within the teachings of the instant disclosure. Some components may be omitted or rearranged. For example, the first manipulation unit 123*a* may be located on another surface of the terminal body, and the second audio output module 152*b* may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151*a* and a display on a rear surface of the window 151*a*, or a metal wire which is patterned directly on the rear surface of the window 151*a*. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1*a*). Therefore, the touch screen may replace at least some of the functions of the first manipulation unit 123*a*.

The first audio output module 152*a* may be implemented in the form of a speaker to output voice audio, alarm sounds, multimedia audio reproduction, and the like.

The window 151*a* of the display unit 151 will typically include an aperture to permit audio generated by the first audio output module 152*a* to pass. One alternative is to allow audio to be released along an assembly gap between the structural bodies (for example, a gap between the window 151*a* and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1b illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1c, a flash 124 is shown adjacent to the second camera 121b. When an image of a subject is captured with the camera 121b, the flash 124 may illuminate the subject.

A laser sensor 143 can be arranged to face a direction identical to a direction at which a camera 121b is facing. In the drawing, although the laser sensor is configured to face a direction identical to a direction at which a second camera 121b of a rear side is facing, the laser sensor can be arranged to face a direction identical to a direction at which a first camera 121a of a front side is facing.

The laser sensor 143 injects a laser signal to an object and receives the laser signal reflected from the object. By doing so, the laser sensor can detect a distance from the object. In case of a proximity sensor, although the proximity sensor can detect an adjacent object only, the laser sensor 143 can measure a distance from a separated object using a feature of straight of laser.

As shown in FIG. 1c, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body.

The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

FIG. 2 is a diagram for an image captured by a camera module according to brightness of a flash 124. In general, if a subject 210 is dark and a background 220 is bright, although a camera module 121 distinctively recognizes the background 220 among an image captured in an angle of the camera module, it is difficult for the camera module to properly recognize a shape of the subject 210 since the subject at the front is dark (refer to FIG. 2 (a)).

On the contrary, if a flash 124 is strongly exploded, as shown in FIG. 2 (b), light is directly radiated to the subject 210 at the front and the subject 210 at the front is captured brightly and the background is captured darkly. Hence, it is able to know that the subject 210 is clearly captured and the background 200 is too dark in a stored image. As shown in FIG. 2 (c), if the flash 124 is exploded with appropriate illuminance in consideration of a distance from the subject 210, it may be able to obtain clear images from the background 220 and the subject 210.

In order to calculate appropriate brightness of the flash 124, in general, the flash 124 performs pre-lighting before emitting light to store an image by the camera module 121. It may be able to calculate appropriate illuminance in consideration of resolution, brightness and the like of an image detected by the camera module 121 when the pre-lighting is performed.

Yet, since capturing time is delayed as much as time of the pre-lighting, if the subject 210 moves or a photographer moves, an image is shaken and a subject may close his or her eyes due to the pre-lighting.

In order to solve the aforementioned problem, the present invention proposes a method of controlling a mobile terminal calculating appropriate illuminance of the flash 124 using a laser sensor 143 instead of the pre-lighting. FIG. 3 is a flowchart for a method of controlling a mobile terminal according to one embodiment of the method of controlling the mobile terminal of the present invention.

A laser sensor includes a laser output unit and a laser reception unit. The laser output unit corresponds to a light source that injects laser. An example of the laser output unit includes a laser diode. Although a general light is injected from a light source in a radial form, since laser corresponds to light of single wavelength and has a feature of straight, the laser has a characteristic of going exactly straight in a direction to which the laser is injected.

The laser sensor 143 is arranged in a direction identical to a direction at which a camera module 121 is facing. Hence, the laser sensor 143 can inject laser to a subject 210 intended to be captured by the camera module 121 [S11]. The laser, which has arrived at the subject 210, is reflected to the laser sensor 143 and the laser is detected by the laser reception unit of the laser sensor 143 [S13].

FIGS. 4 and 5 are diagrams for explaining a method of measuring a distance from a subject 210 using a laser sensor 143 according to one embodiment of a method of controlling a mobile terminal of the present invention. As shown in FIG. 4, it is able to calculate a distance from the subject 210 using a difference between time of injecting a laser signal and time of receiving the laser signal in a laser reception unit [S15]. In this case, as shown in FIG. 5, if the laser signal has a unique waveform, it may be easier to calculate delay of a received laser signal.

Speed of light multiplied by a difference between time of outputting a laser signal and time of arriving at a reception unit of the laser signal becomes a distance between a subject 210 and a mobile terminal. In this case, an indication icon 1512, which calculates a distance from the subject 210 using the laser sensor 143, can be outputted on a display unit 151 of the mobile terminal 100.

If the laser sensor 143 is used, a distance can be calculated within several µs. Hence, it may be able to solve a time delay problem due to pre-lighting and a problem that a subject 210 closes his or her eyes does not occur. Moreover, since a flash 124 injects strong light, an amount of battery consumption is big, whereas the laser sensor 143 has very small amount of battery consumption. Hence, the laser sensor is superior to the flash in terms of energy.

After the distance from the subject 210 is calculated, it may be able to calculate standard illuminance in proportion to the distance between the mobile terminal 100 and the subject 210. The flash 124 can emit a light based on the calculated standard illuminance [S35]. In this case, the camera module 121 stores a first image [S37].

Although an image of appropriate brightness can be obtained by an image stored when the flash emits a light based on the standard illuminance, images of little bit different brightness can be captured n times, stored and a synthesized image can be generated by synthesizing a plurality of first images [S40].

FIG. 6 is a diagram for an image according to brightness of a flash 124 according to one embodiment of a method of controlling a mobile terminal of the present invention. As shown in FIG. 6, it may be able to obtain a first image (a) stored in a state darker than standard illuminance, a first image (b) stored in the standard illuminance and a first image (c) stored in a state brighter than the standard illuminance. The number (n) of the first images may become three or more.

If the flash 124 injects light with illuminance darker than the standard illuminance, an overall dark image is obtained (a). If the flash 124 injects light with the standard illuminance, it may be able to obtain an image of evenly bright (b). Yet, brightness of the flash 124 is brighter in (b) compared to (a), brightness of a subject 210 positioned near is brighter than brightness of a background 220. If the flash 124 injects light brighter than the standard illuminance, the subject 210 is captured brightly but the background 220 is captured darkly. Hence, the background 220 is more unclear than (a) and the subject 210 is captured brightly.

An amount of light flowing in the camera module 121 can be controlled by controlling exposure time without adjusting illuminance of the flash 124. FIG. 7 is a diagram for an image according to exposure time of an aperture according to one embodiment of a method of controlling a mobile terminal of the present invention.

Exposure time can be manually or automatically designated according to brightness of an image captured by a camera module 121. Referring to FIG. 7, it may be able to obtain a plurality of images including a first image (a) obtained by opening an aperture for a time shorter than a designated exposure time, a first image (b) obtained by opening the aperture for the designated exposure time and a first image (c) obtained by opening the aperture for a time longer than the designated exposure time.

An image obtained via a short exposure time is overall dark (a), an image obtained via an appropriate exposure time has appropriate brightness (b) and an image obtained via a long exposure time is bright (c). Since brightness of the flash 124 is constant, a shadow difference between the background 220 and the subject 210 according to the first image is not big compared to the embodiment of FIG. 6. Although the exposure time is controllable, it may also be able to obtain images different from each other in brightness by controlling degree of opening of the aperture, i.e., degree of exposure.

As mentioned in the foregoing description, it may be able to obtain a plurality of first images different from each other in brightness by changing illuminance of the flash 124 on the basis of standard illuminance or changing the degree of exposure by controlling the aperture.

FIG. 8 is a diagram for a synthesized image according to one embodiment of a method of controlling a mobile terminal of the present invention. A plurality of the first images can be synthesized into a single image in a manner of combining appropriate parts in brightness of a plurality of the first images with each other [S40]. The subject 210 and the background 220 are clearly seen in the synthesized image. It may be able to obtain a high-quality image of appropriate brightness via the synthesized image.

FIG. 9 is a flowchart for a method of controlling a mobile terminal according to a different embodiment of the method of controlling the mobile terminal of the present invention. As mentioned in the foregoing embodiment, besides the first image obtained after light is injected by the flash 124, a synthesized image of appropriate brightness can be obtained using a second image, which is obtained before the flash is exploded.

According to drawing, although the second image is obtained after standard illuminance is calculated [S31], if the flash 124 does not inject light yet, the second image can be obtained prior to the step S11 to S31. Yet, if time difference between timing of storing the first image and timing of storing the second image is big, the subject 210 or a photographer may move. Hence, it is preferable to store the second image before the flash injects light.

FIG. 10 is a diagram for an image captured by a camera module 121 according to a different embodiment of a method of controlling the mobile terminal of the present invention. As shown in FIG. 10, if a subject 210 is dark and a background is bright, the subject 210 is captured darkly and the background is captured brightly before the flash 124 is exploded (a). On the contrary, the subject 210 is captured brightly and the background is captured darkly after the flash 124 is exploded (b).

FIG. 11 is a diagram for a process of obtaining a synthesized image by synthesizing images of FIG. 10. It may be able to synthesize an image of appropriate brightness by extracting a background 220 part and a subject 210 part from the first image and the second image, respectively (c).

FIG. 12 is a flowchart for a method of controlling a mobile terminal according to a further different embodiment of the method of controlling the mobile terminal of the present invention and FIG. 13 is a diagram for a third image according to a further different embodiment of a method of controlling a mobile terminal of the present invention.

As shown in FIG. 13 (a), in case of taking close-up picture of a black-color object, most of image captured by a camera module 121 becomes black color. Hence, a controller, which controls exposure on the basis of an amount of light flowing in the camera module 121, increases the exposure by opening an aperture.

If the exposure is increased by opening the aperture, a noise may appear on an image and quality of the image may be degraded. And, the image may have a color brighter than a color of an actual subject 210. In order to solve the aforementioned problem, if an amount of light flowing into the camera module 121 is less, it may be able to control the exposure of the aperture by determining whether a color of the subject 210 is dark or lighting is dark and may be then able to determine whether to emit light of the flash 124.

Referring to FIG. 12, according to the present embodiment, surrounding illuminance can be measured using an illumination sensor [S21] and the illumination sensor determines whether the surrounding illuminance is brighter than standard illuminance [S23]. If the surrounding illuminance is darker than the standard illuminance, the flash 124 should be exploded. Hence, as shown in FIG. 3, a first image is stored when the flash 124 injects light.

On the contrary, when the surrounding illuminance is brighter than the standard illuminance, in case of capturing a near subject 210, since surrounding illuminance of the subject 210 is also bright, it is not necessary to open the aperture. A dark color of an object recognized by the camera module 121 can be determined as an actual color of the subject 210 instead of being recognized as the dark color due the deficiency of light [S25].

It may be able to reduce an amount of light flowing in the camera module by controlling exposure in a manner of automatically closing an opened aperture [S27]. When the camera module 121 misrecognizes a dark color as dark surrounding illuminance and the aperture is automatically opened, if the aperture is controlled to the degree of opening of a bright situation, a third image of a color close to an actual color of the subject 210 can be obtained [S29]

According to at least one embodiment of the present invention, since it is able to obtain an image of which a whole screen is maintained by a reasonable brightness, a subject 210 and a background 220 can be included in an image.

And, it may be able to prevent picture taking time from being delayed and reduce power consumption due to pre-lighting of a flash 124 by omitting the pre-lighting.

And, an original color of a subject 210 can be represented by distinguishing a case of a subject 210 of a black color from a case of less light.

The foregoing embodiments are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

The invention claimed is:

1. A method of controlling a mobile terminal, the method comprising:
   injecting a laser signal to a direction at which a camera module of the mobile terminal is facing;
   receiving a reflected laser signal corresponding to the injected laser signal returned in a manner of being reflected from a subject;
   calculating a distance from the subject using a difference between a time of injecting the laser signal and a time of receiving the reflected laser signal;
   calculating a brightness of a sidelight within an angle of the camera;
   calculating a standard illuminance of a flash of the mobile terminal based on the distance from the subject;
   injecting light by controlling the flash according to the standard illuminance;
   controlling an exposure of the camera module based on the distance from the subject and the brightness of the sidelight; and
   storing a first image containing the subject using the camera module,
   wherein if the brightness of the sidelight is dark and the distance from the subject is less than a standard distance, the controlling the exposure reduces the exposure.

2. The method of claim 1, wherein the injecting the light further comprises:
   injecting the light with over illuminance brighter than the standard illuminance;
   injecting the light with the standard illuminance; and
   injecting the light with under illuminance darker than the standard illuminance, and wherein the storing the first image further comprises respectively storing the first image when the light is injected with the over illuminance, the standard illuminance and the under illuminance.

3. The method of claim 1, wherein the storing the first image stores a plurality of first images by differentiating exposure.

4. The method of claim 2, further comprising the generating a synthesized image by extracting a part captured by appropriate brightness from the plurality of the first images.

5. The method of claim 1, further comprising:
   storing a second image containing a subject prior to the injecting the light; and
   synthesizing a background of the second image with the subject of the first image.

6. The method of claim 1, further comprising calculating reflectivity of the subject using a difference between an amount of light of the injected laser signal and an amount of light of the reflected laser signal,
   wherein the calculating the standard illuminance calculates the standard illuminance in consideration of the distance from the subject and the reflectivity of the subject.

7. The method of claim 1, wherein the injected laser signal comprises a unique waveform.

8. The method of claim 1, further comprising measuring a surrounding illuminance,
   wherein if the surrounding illuminance is bright, the injecting the light is omitted, and
   wherein the light is injected only when the surrounding illuminance is dark.

9. A mobile terminal, comprising:
   a lens to which light is inputted;
   a camera module configured to generate a first image by storing the light inputted via the lens;
   a flash configured to inject light to a direction at which the lens is facing;
   a laser output unit configured to inject a laser signal to the direction at which the lens is facing;
   a laser reception unit configured to detect a reflected laser signal corresponding to the injected laser signal returned in a manner of being reflected from a subject; and
   a controller configured to:
   calculate a distance from the subject using a difference between a time of injecting the laser signal and a time of receiving the reflected laser signal,
   calculate a brightness of a sidelight within an angle of the camera module,
   calculate a standard illuminance of the flash based on the calculated distance from the subject,
   control the flash to inject light according to the standard illuminance,
   control an exposure of the camera module based on the distance from the subject and the brightness of the sidelight, and
   store a first image containing the subject using the camera module,
   wherein if the brightness of the sidelight is dark and the distance from the subject is less than a standard distance, the controller is configured to reduce an exposure time.

10. The mobile terminal of claim 9, wherein the controller is configured to control an illuminance of the flash to inject the light with over illuminance brighter than the standard illuminance, inject the light with the standard illuminance and inject the light with under illuminance darker than the standard illuminance, and
   wherein the camera module is configured to respectively store the first image when the light is injected with the over illuminance, the standard illuminance and the under illuminance.

11. The mobile terminal of claim 9, further comprising an aperture configured to control an amount of light inputted to the camera module,
   wherein the controller is configured to adjust an exposure by controlling a degree of opening of the aperture, and
   wherein the camera module is configured to store a plurality of first images according to the control of the aperture.

12. The mobile terminal of claim 10, wherein the controller is configured to generate a synthesized image by extracting a part captured by appropriate brightness from a plurality of the obtained first images.

13. The mobile terminal of claim 9, wherein the camera module is configured to obtain a second image before the flash injects light, and
   wherein the controller is configured to generate a synthesized image by extracting a subject and a background from the first image and the second image, respectively.

14. The mobile terminal of claim 9, wherein the controller is configured to calculate a reflectivity of the subject using a difference between an amount of light of the injected laser signal and an amount of light of the reflected laser signal and calculate the standard illuminance in consideration of the reflectivity of the subject.

15. The mobile terminal of claim 9, further comprising an illumination sensor configured to measure a surrounding illuminance,
   wherein if the surrounding illuminance is bright, the controller is configured to control the flash not to inject light.

16. The mobile terminal of claim 11, wherein the controller is configured to generate a synthesized image by extracting a part captured by appropriate brightness from a plurality of the obtained first images.

\* \* \* \* \*